US010968723B2

(12) United States Patent
Rao et al.

(10) Patent No.: US 10,968,723 B2
(45) Date of Patent: Apr. 6, 2021

(54) FOAM CLEANOUT METHODS AND SYSTEMS FOR WELLBORES

(71) Applicants: Sai S. Rao, Spring, TX (US); Kaustubh S. Kulkarni, The Woodlands, TX (US)

(72) Inventors: Sai S. Rao, Spring, TX (US); Kaustubh S. Kulkarni, The Woodlands, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 168 days.

(21) Appl. No.: 16/006,922

(22) Filed: Jun. 13, 2018

(65) Prior Publication Data
US 2019/0055819 A1   Feb. 21, 2019

Related U.S. Application Data

(60) Provisional application No. 62/546,357, filed on Aug. 16, 2017.

(51) Int. Cl.
| E21B 37/00 | (2006.01) |
| E21B 47/06 | (2012.01) |
| C09K 8/536 | (2006.01) |
| G01N 9/36 | (2006.01) |
| C09K 8/52 | (2006.01) |
| C09K 8/94 | (2006.01) |
| E21B 21/14 | (2006.01) |
| E21B 47/00 | (2012.01) |
| G01N 11/00 | (2006.01) |

(Continued)

(52) U.S. Cl.
CPC .............. *E21B 37/00* (2013.01); *C09K 8/536* (2013.01); *E21B 43/267* (2013.01); *E21B 47/00* (2013.01); *E21B 47/06* (2013.01); *E21B 47/07* (2020.05); *E21B 47/08* (2013.01); *G01N 11/00* (2013.01); *E21B 41/02* (2013.01); *G01N 9/36* (2013.01); *G01N 11/02* (2013.01)

(58) Field of Classification Search
CPC . C09K 8/703; C09K 8/52; C09K 8/94; C09K 8/536; E21B 21/14; E21B 37/00; E21B 47/06; E21B 21/00
See application file for complete search history.

(56) References Cited

U.S. PATENT DOCUMENTS 3,486,560 A * 12/1969 Hutchison ............... E21B 21/14
166/292
7,268,100 B2   9/2007 Kippie et al.
(Continued)

OTHER PUBLICATIONS

Duan, Mingqin, "Study of Cuttings Transport Using Foam With Drill Pipe Rotation Under Simulated Downhole Conditions," The University of Tulsa The Graduate School, 2007, pp. 161-162.
(Continued)

*Primary Examiner* — Catherine Loikith
(74) *Attorney, Agent, or Firm* — ExxonMobil Upstream Research Company—Law Department

(57) ABSTRACT

System and methods for cleaning debris or particulates from a wellbore using foam is provided, including predicting if a foam cleanout of a well is feasible by calculating foam properties at each of a number of segments in a well during a foam cleanout, comparing the foam properties to screening limits, providing an output to indicate if a foam cleanout is feasible. If feasible, the foam cleanout is performed.

18 Claims, 9 Drawing Sheets

(51) Int. Cl.
*E21B 43/267* (2006.01)
*E21B 47/08* (2012.01)
*E21B 47/07* (2012.01)
*E21B 41/02* (2006.01)
*G01N 11/02* (2006.01)

(56) References Cited

U.S. PATENT DOCUMENTS

| | | | | |
|---|---|---|---|---|
| 2007/0169932 | A1* | 7/2007 | Lindvig | C09K 8/74 |
| | | | | 166/250.1 |
| 2014/0262265 | A1* | 9/2014 | Hutchins | C09K 8/92 |
| | | | | 166/280.2 |
| 2016/0024375 | A1* | 1/2016 | Li | E21B 43/26 |
| | | | | 166/308.5 |
| 2016/0341031 | A1* | 11/2016 | Yerubandi | E21B 47/06 |

OTHER PUBLICATIONS

Ozbayoglu, Mehmet Evren, "Cuttings Transport with Foam in Horizontal and Highly-Inclined Wellbores," The University of Tulsa The Graduate School, 2002, pp. 83-84, 120-127.
Duan, et al., (2010) "Experimental Study and Modeling of Cuttings Transport Using Foam with Drillpipe Rotation," SPE Drilling & Completion vol. 25, Issue 03, pp. 352-362.
Ozbayoglu, E. (2002) "Cuttings Transport with Foam in Horizontal and Highly-Inclined Wellbores", Dissertation, The University of Tulsa, 249 pages.
Ozbayoglu, et al. (2003) "Cuttings Transport with Foam in Horizontal & Highly-Inclined Wellbores", SPE/IADC 79856, Society of Petroleum Engineers, Feb. 19-21, 2003, pp. 1-9.
Xu, et al., (2013) "Cuttings Transport with Foam in Highly Inclined Wells at Simulated Downhole Conditions," Arch. Min. Sci., vol. 58, No. 2, pp. 481-494.

* cited by examiner

200

Inputs

| | | |
|---|---|---|
| MD | 15000.00 ft | Liquid Rate | 80.00 galUS/min |
| TVD | 10000.00 ft | +/- | 5.00 % |
| Casing ID | 6.00 ft | STD Gas Rate | 2000.00 ft3/min |
| Coil Length | 20000.00 ft | +/- | 5.00 % |
| Coil OD | 2.38 ft | Pump Pressure | 4000.00 psia |
| Coil ID | 2.00 ft | +/- | 5.00 % |
| Proppant Mesh | 20/40 | CP Running Speed | 20.00 |
| Density | 2.65 gLiquid | +/- | 5.00 % |
| Bed Height | 3.00 in | | |
| Liquid Comp. | Water | | |
| Gas Comp. | Nitrogen | | |
| Reservoir Pressure | psia | | Calculate |
| Choke Pressure | 14.70 psia | | |

FOAM CLEANOUT METHODS AND SYSTEMS FOR WELLBORES

CROSS REFERENCE TO RELATED APPLICATIONS

This application claims the benefit of U.S. Provisional Application Ser. No. 62/546,357 filed Aug. 16, 2017, the disclosure of which is incorporated herein by reference in its entirety.

FIELD

The techniques described herein provide a method for reworking wells that have been hydraulically fractured. More specifically, the techniques address the use of a system to predict if a well can be cleaned out to remove proppant sand using foam.

BACKGROUND

This section is intended to introduce various aspects of the art, which may be associated with exemplary embodiments of the present techniques. This description is believed to assist in providing a framework to facilitate a better understanding of particular aspects of the present techniques. Accordingly, it should be understood that this section should be read in this light, and not necessarily as admissions of prior art.

Recent oil production techniques use hydraulic fracturing to create cracks in rock formations to release hydrocarbons, such as petroleum and natural gas. The cracks are held open with a proppant, which may be sand, aluminum oxide, or other material that has been mixed in with the fracturing fluid. Although sand is used to describe the proppant herein, it may be understood that any of the other materials that may be used as proppants are within the scope of the present disclosure.

During production, a percentage of the sand in the fractures may flow back into the wellbore and accumulate in horizontal sections. The accumulation of the sand forms bridges, which may decrease the flow cross-sectional area and lower production. This may be mitigated by performing a cleanout operation on the well. The cleanout operation removes the sand from the well, for example, bringing it to the surface. If the anticipated increase in production obtained by cleaning out sand is economically justifiable, a cleanout operation is planned.

Sand has traditionally been cleaned out using cost-effective liquids-based fluid, such as water and gelled water, or water-based (aqueous) drilling fluids or non-water-based drilling fluids (e.g., non-aqueous). However, after reservoir depletion many shale gas wells reach lower reservoir pressures that do not support the hydrostatic pressures of water. Accordingly, if water is used it will be lost to the formation, not only failing to clean out the sand, but also potentially damaging the formation. Another cleanout material that has been explored for low-pressure wells is foam. As an aerated fluid, foam is significantly less dense then water. Accordingly it m attention for sand cleanout in completions in low bottom hole pressure (BHP) wells. These foams may have very small dense bubbles, for example, resembling a foamy shaving cream.

For example, a study performed at the University of Tulsa Drilling Research Projects (TUDRP), suggested that as foam quality decreases at a given flow rate and rate of penetration, cuttings bed thickness also decreases. In this study, data from cuttings transport experiments with foam were compared with results from a simulator. The experimental parameters included 70° to 90° of inclination, average annular velocities of 1 ft./s to 16 ft./s, rates of penetration of 20 ft./h to 90 ft./h, and foam qualities of 70% to 90%. As described in greater detail herein, foam quality is the ratio of gas volume to total volume (gas volume plus liquid volume) for the foam. See Xu, J., et al., Cuttings Transport with Foam in Highly Inclined Wells at Simulated Downhole Conditions, Arch. Min. Sci., Vol. 58 (2013), No 2, pp. 481-494.

Foam has also been used as a drilling fluid, such as for use with rotating drill bit formation drilling. For example, U.S. Pat. No. 7,268,100 discloses a shale inhibition additive for oil/gas downhole fluids. The additive may be used in a foam composition as a drilling fluid.

However, the cleanout operation is challenging due to the complex foam rheology and hydraulics. Foam stability is affected by downhole pressures and temperatures. Thus, the use of foam may not be feasible for some wells. Predicting which wells may feasibly use a foam cleanout may substantially lower costs, for example, eliminating the need for equipment placement when a foam cleanout is not feasible.

SUMMARY

In an example, a method is provided for predicting if a foam cleanout of a well is feasible. The method includes calculating foam properties at each of a number of segments in a well during a foam cleanout, comparing the foam properties to screening limits, providing an output to indicate if a foam cleanout is feasible. If feasible, the foam cleanout is performed, and if not feasible, the method may also include adjusting the foam properties and repeating the calculating and comparing steps and provide another output for review, until the output indicates that the foam cleanout is feasible.

A determination may be made that the foam cleanout is feasible by determining if a minimum quality calculated for the foam is greater than a lower limit for foam stability, a maximum quality calculated for the foam is less than an upper limit for foam stability, and a choke pressure is less than a choke pressure limit. The lower limit for foam stability may be about 0.6, and the upper limit for foam stability may be about 0.9. The choke pressure limit may be at atmospheric pressure. The determination that the foam cleanout is feasible may be made by determining if a foam pressure at bottom hole is within the selected error range of a reservoir pressure.

The method may include calculating properties for a foam at a pump outlet, calculating a frictional pressure drop in a coil tubing on a surface reel, calculating the frictional pressure drop and a hydrostatic pressure increase in a coil tubing in a vertical well section, and calculating the frictional pressure drop in a coil tubing in a horizontal section of a well. The properties of the foam and a sand transport rate at an exit of a coil tubing may be calculated. The frictional pressure drop in an annulus in a horizontal well section may be calculated. The frictional pressure drop and a hydrostatic pressure decrease in annulus in the vertical well section may be calculated.

In each segment of a well, the foam properties at an exit from the segment may be calculated. The average foam properties may be calculated for the segment. A frictional pressure drop may be calculated based on the average foam properties in the segment. A dynamic pressure due to acceleration properties in the segment may be calculated. The hydrostatic pressure properties may be iteratively calculated for the segment, and a pressure at an exit from the segment may be determined.

A geothermal gradient in the well may be determined. Foam properties may be calculated by using a foam equation of state to solve for changes in foam quality, based, at least in part, on a change in temperature, the change in pressure, or both.

A frictional pressure drop may be calculated by calculating an effective hydraulic diameter for a total length of the well, wherein the total length comprises vertical well sections and horizontal well sections. The frictional pressure drop due to friction of foam with the well may be calculated based, at least in part, on the effective hydraulic diameter.

A hydrostatic pressure change for a vertical column of foam may be calculated from an equation of state for foam quality based, at least in part, on a foam density without entrained proppant. A hydrostatic pressure change for vertical column of foam may be calculated from an equation of state for foam quality based, at least in part, on a foam density with entrained proppant.

Foam properties may be calculated based, at least in part, on a rheological property of a foam, a density of the foam, or both. A power law model may be used to determine a rheology of a foam. An effective Reynolds number for a foam may be calculated based, at least in part, on an effective hydraulic diameter. A sand transport rate for a foam may be determined.

The foam cleanout may be modeled at a number of conditions to determine if a foam cleanout. A sensitivity study may be performed to determine a proppant cleanout rate for each of the plurality of conditions to determine which combination of parameters provide a highest proppant cleanout rate. The well cleanout may be performed using the combination of parameters that provides the highest proppant cleanout rate.

The foam may be formed by injecting gas into a mixer that includes water and surfactant. The foam may be passed through a coil tubing. The coil tubing may be fed through the well to reach a proppant bed in a horizontal well section. Entrained proppant may be carried out of the well in the foam, and separated from the foam at the surface. Equipment may be selected for the foam cleanout based, at least in part, on a result of the sensitivity study.

In another example, a system is provided for predicting if a foam cleanout of a well is feasible. The system includes a computing system to implement calculation modules. The system also includes a foam calculator including a geothermal gradient module to determine a geothermal gradient in the well, a foam compressibility module to use a foam equation of state to solve for changes in quality of a foam, a hydraulics module to calculate a hydraulic pressure of a foam column, a foam properties module to calculate rheological properties of the foam, and a whole cleaning module to calculate a sand transport rate.

The geothermal gradient module may determine a bottom hole temperature, $T_{BH}$, from a surface temperature and a total vertical depth. The foam equation of state may be based, at least in part, on an ideal gas law equation. The system may include a hydraulics model derived from a differential equation for hydrostatic pressure and a density of the foam.

The foam properties module may use a power law model to determine an effective viscosity for the foam. The foam properties module may determine a Reynolds number for a flow of the foam.

In another example, a non-transitory, machine readable medium is provided. The non-transitory, machine readable medium includes code that, when executed, directs a processor to obtain parameters for a foam cleanout of a well from a user, to calculate a geothermal gradient in the well, to calculate changes in a quality of the foam. The non-transitory, machine readable medium also includes code that, when executed, directs the processor to calculate a hydraulic pressure of a foam column, calculate rheological properties of the foam, calculate a sand transport rate, and report a feasibility for the foam cleanout at each of a plurality of parameters.

The non-transitory, machine readable medium may include code that, when executed, directs the processor to calculate a bottom hole temperature, $T_{BH}$, from a surface temperature and a total vertical depth. Code may be included that, when executed, directs the processor to solve a foam equation of state based, at least in part, on an ideal gas law equation. Code may be included that, when executed, directs the processor to solve a hydraulics equation derived from a differential equation for hydrostatic pressure and a density of the foam.

The non-transitory, machine readable medium may include code that, when executed, directs the processor to solve a power law model to determine an effective viscosity for the foam. Code may be included that, when executed, directs the processor to determine a Reynolds number for a flow of the foam. Code may be included that, when executed, directs the processor to display a sand transport rate for each of the plurality of parameters.

DESCRIPTION OF THE DRAWINGS

The advantages of the present techniques are better understood by referring to the following detailed description and the attached drawings.

FIG. 6 is a screenshot of an example of a foam calculator to a foam calculator that may use the method of FIG. 5 to predict whether a foam cleanout may be used in a well.

DETAILED DESCRIPTION

Figure 1:
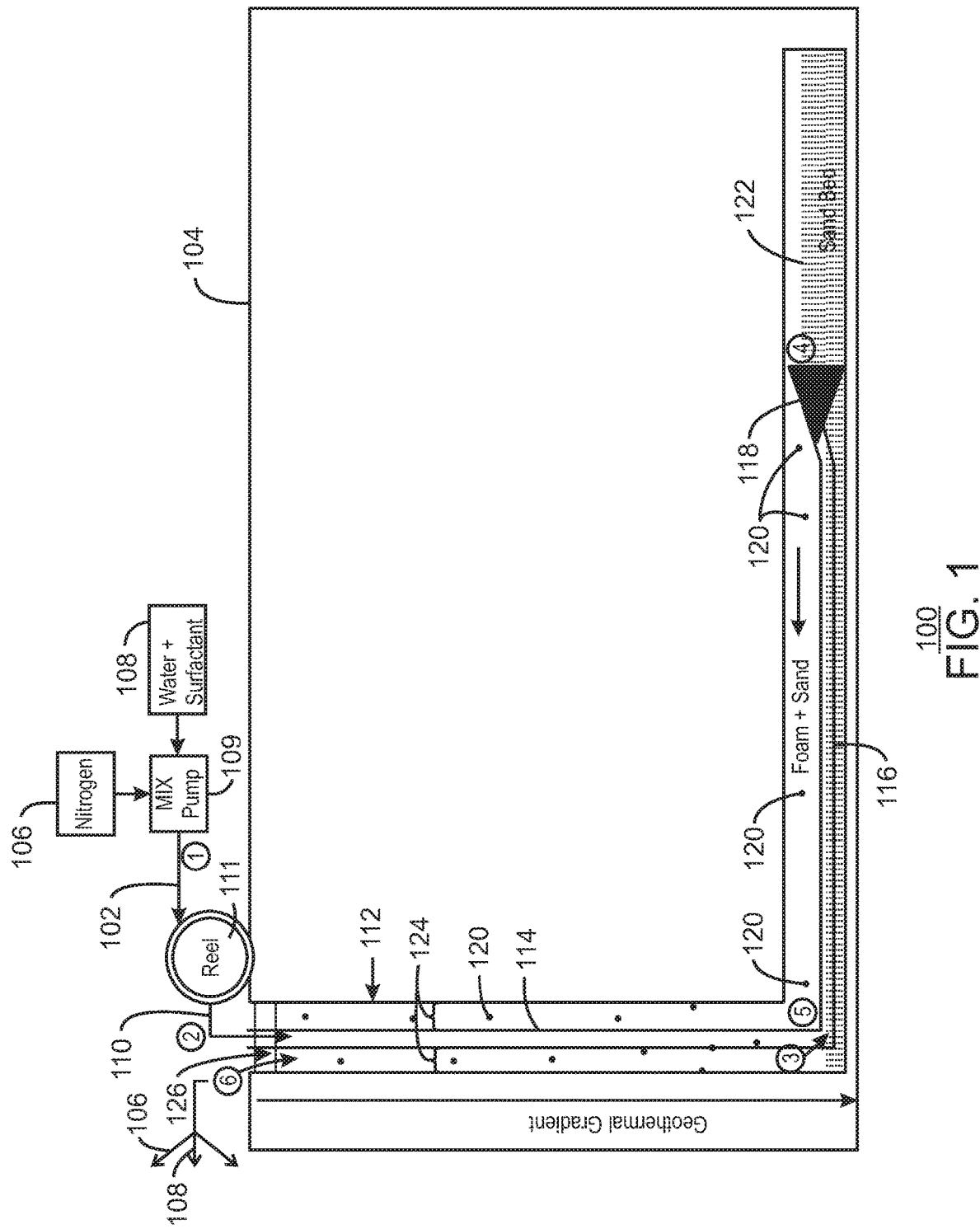
FIG. 1 is a schematic drawing of an example of a well cleanout using foam.

In the following detailed description section, specific embodiments of the present techniques are described. However, to the extent that the following description is specific to a particular embodiment or a particular use of the present techniques, this is intended to be for exemplary purposes only and simply provides a description of the exemplary embodiments. Accordingly, the techniques are not limited to the specific embodiments described below, but rather, include all alternatives, modifications, and equivalents falling within the true spirit and scope of the appended claims.

As described herein, over time proppants in hydraulically fractured wells may migrate back into the production tubular, creating bridges that slowly reduce the effective diameter of the production tubular. This reduces the production that may be obtained from the well. To restore production, the proppants may be removed, for example, using a of fluid injected through a coil tubing to sweep the proppants to the surface in a process termed a sand cleanout. Although the sand is used to generically refer to proppants herein, it may be noted that the techniques described in examples may be used with any type of proppants, including sand, aluminum, titania, or any other materials.

Sand cleanouts may be performed using an aqueous solution. However, reservoir pressures may not be high enough to support the pressure of a water column for an aqueous solution. In these cases, the aqueous solution may be lost to the formation, leading to an ineffective cleanout or damage to the formation. The use of a foam as the sweeping agent in a sand cleanout may provide a lower density, and thus, a reduced hydrostatic pressure. Although the foam referred to herein is based on gas bubbles suspended in an aqueous solution, the foam is not limited to being in an aqueous solution, but may be created using other liquids, such as diesel fuel, among others.

However, sand cleanouts using a foam may not be feasible either. For example, the hydrostatic pressure of the foam may still be higher than the pressure of the reservoir, leading to loss of the foam into the formation. Further, the pressures and temperatures in a well may interfere with the stability or quality of the foam. This may lead to a collapse of the foam, resulting in a separation of the gas and liquid phases in the foam. As mobilizing equipment to perform a foam cleanout operation can be expensive, it would be useful to have a tool to predict whether a foam cleanout would be feasible.

A foam calculator, disclosed in examples herein, which may be used to predict if a sand cleanout operation may be successful for a given well. This may reduce or eliminate the costs involved in mobilizing foam cleanout equipment for wells where it is not feasible. The foam hydraulics calculator uses a bulk model for foam (bubble size<<pipe dia.), in which the foam is characterized by properties such as rheology and density. This may reduce or eliminate the costs involved in mobilizing foam cleanout equipment for wells where it is not feasible.

The foam calculator may be used to perform a parametric study of the various operational parameters for a foam cleanout, such as gas rate, liquid rate, pump and choke pressure, coil tubing running speed, and the like. The results may be used to increase the sand cleanout rate by improving the selection of the parameters.

The foam calculator may also be used to perform sensitivity studies. These studies may influence the choice of surface equipment, such as the precision of a control valve used for the gas or liquid injection rates, the pump specifications, the use of and back pressure settings for a choke valve, and the like. The sensitivity studies may also be used to adjust the specifications for the foam for particular well, such as the foaming agent, polymer stabilization agents selected, and the like.

At the outset, for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

An "aqueous phase" refers to a fluid stage of a substance that is based on water in a liquid state, such as a solution of a substance in water.

An "annulus" is an open section of a well formed between the inner edge of an outer tubular, and an outer edge of an inner tubular. In examples described herein, the annulus is between the inner surface of the well and the outer surface of the coil tubing.

"Coil tubing" refers to a very long metal pipe, often about 25 to 83 millimeters (mm) (1 to 3.25 inches) in diameter, which is supplied spooled on a large reel, termed a "surface reel" herein. Coil tubing may be used for interventions in oil and gas wells, such as cleaning out proppants or other debris that has accumulated in a well.

"Dynamic pressure" refers to a kinetic energy per unit volume of a flowing fluid. It may be derived from the conservation of energy for a fluid in motion.

"Fracturing" refers to the process and methods of breaking down a geological formation and creating a fracture, i.e. the rock formation around a well bore, by pumping fluid at very high pressures, to increase production rates from a hydrocarbon reservoir. The fracturing methods otherwise use conventional techniques known in the art.

"Frictional pressure drop" refers to a pressure drop that occurs because of resistance to flow. In a pipe or coil tubing, the friction is between the foam and the walls of the pipe.

"Foam" refers to a suspension of gas bubbles in a liquid that is stabilized with additives, as described herein. A primary measurement of the characteristic of a foam is its quality, which is determined by the proportion of gas volume to total volume.

"Foam properties" include several properties that may affect the flow and proppant carrying capacity of a foam. The foam properties may include rheological properties, density, and quality, among others.

"Hydraulic diameter" refers to the effective diameter of a pipe that would be carrying an equivalent amount of fluid flowing in an open space. For example, a well that has a coil tubing inserted in it forms an annulus that has a smaller effective diameter than the well with no inserted line. Geometric techniques may be used to calculate the hydraulic diameter, which may be used to calculate the Reynolds number and other properties.

"Geothermal gradient" refers to the rate at which the temperature increases in a well as the depth increases.

"Hydraulic fracturing" refers to creating or opening fractures that extend from the wellbore into formations. A fracturing fluid, typically viscous, can be injected into the formation with sufficient hydraulic pressure (for example, at a pressure greater than the lithostatic pressure of the formation) to create and extend fractures, open pre-existing natural fractures, or cause slippage of faults. In the formations discussed herein, natural fractures and faults can be opened by the pressure. A proppant may be used to "prop" or hold open the fractures after the hydraulic pressure has been released. The fractures may be useful for allowing fluid flow, for example, through a tight shale formation, or a geothermal energy source, such as a hot dry rock layer, among others. A fracturing fluid is typically 90% water, 9.5% proppant, and about 0.5% chemical additives.

"Hydrocarbons" refer to an organic compound that primarily includes the elements hydrogen and carbon, although nitrogen, sulfur, oxygen, metals, or any number of other elements may be present in small amounts. As used herein, hydrocarbons generally refer to components found in natural gas, oil, or chemical processing facilities.

"Hydrostatic pressure" refers to the pressure that is exerted by a fluid due to the force of gravity. Hydrostatic pressure increases in proportion to the height of a column of the fluid because of the increasing weight of fluid exerting downward force.

"Proppants" refers to a composition of sized particles mixed with fracturing fluid to open and/or hold fractures open during and after a hydraulic fracturing treatment. In addition to naturally occurring sand grains, the sized proppant particles can be man-made or specially engineered particles, such as resin-coated sand or high-strength ceramic materials like sintered bauxite, among others.

A "reservoir" refers to a subsurface rock formation from which a production fluid can be harvested. The rock formation may include shale, granite, silica, carbonates, clays, and organic matter, such as oil, gas, or coal, among others.

A "Reynolds number" is a dimensionless quantity that helps to predict flow properties, for example, in a tubular. The Reynolds number may be used to predict when a flow, such as of a foam, will transition from laminar to turbulent flow.

"Substantial" when used in reference to a quantity or amount of a material, or a specific characteristic thereof, refers to an amount that is sufficient to provide an effect that the material or characteristic was intended to provide. The exact degree of deviation allowable may depend, in some cases, on the specific context.

A "suspension" refers to a heterogeneous mixture containing solid particles. The internal phase (solid) is dispersed throughout the external phase (fluid or foam) with the use of certain excipients or suspending agents. Suspensions will eventually settle over time if left undisturbed.

"Subterranean formation" or formation refers to the material existing below the Earth's surface. The formation may comprise a range of components, e.g. minerals such as quartz, siliceous materials such as sand and clays, as well as the oil and/or gas that is extracted. As used herein, formation may include a reservoir.

"Tubular construct" refers to tubing or a system of tubes, tubulars, pipes, pipelines, flowlines, and the like used for holding or transporting any liquids and/or gases, and any incidental particulate matter or solids, from one location to another.

"Wellbore" refers to at least one wellbore drilled into a subterranean formation, which may be a reservoir or adjacent to a reservoir. A wellbore can have vertical and horizontal sections, and it can be straight, curved, or branched. As used herein, the term "wellbore" refers to a wellbore itself, including any uncased, open-hole portion of the wellbore. The entire wellbore, including both cased and uncased sections, may be termed a "well". As used herein, a vertical well section is parallel to the force of gravity, and a horizontal well section is perpendicular to the form of gravity.

FIG. 1 is a schematic drawing 100 of an example of a well cleanout using foam. The circled numbers refer to particular points within the process that are used in calculations, as described in examples.

During a cleanout operation, foam 102 is generated at the surface 104 by injecting a gas 106, such as nitrogen, into a base liquid 108, such as water mixed with a surfactant. The gas 106 may be generated at the site, for example, using a nitrogen plant that includes a membrane purification system or a pressure swing absorption system, among others. In addition to water and surfactant, the base liquid 108, may include any number of other additives, such as a corrosion inhibitor, a shale inhibitor, polymers, and the like, in various proportions. This may provide a foam with the desired stiffness, rheology, stability, and half-life. The injection of the gas 106 into the base liquid 108 may take place in a pumping apparatus 109 that may include mixing elements.

The surfactants may act as a foaming agent, stabilizing the suspension of gas bubbles in the liquid. Surfactants that may be used in aqueous solutions include alkanolamide, sodium stearate, 4-(5-dodecyl) benzenesulfonate, a linear dodecylbenzenesulfonate, a linear alkylbenzenesulfonate, a lignin sulfonate, a fatty alcohol ethoxylate, an alkylphenol ethoxylate, an amine oxide, an alcohol ether sulfate having an ethylene oxide numbers ranging from 3 to 5 and amphoteric at high pH, or a blend of alcohol ethoxy sulfates (AES), among others.

Other additives that may be used include gilsonites, modified asphalts, and copolymers, for example, to improve filtration control and rheological properties of the foam. Viscosifiers, such as hydroxyethyl cellulose, may be used to improve the solids carrying capacity. Calcium hydroxide may be used in some formulations to improve the performance of surfactants, such as oxidized tall-oil fatty acid. Calcium hydroxide may also control $CO_2$ and $H_2S$ gases that may be encountered during drilling.

In many examples, the well may be in a shale formation. Shale inhibitors may be used to prevent swelling of the shale, which could lead to damage to the formation. The shale inhibitors may include potassium chloride, potassium formate, and anionic polymers or copolymers, among others.

Corrosion inhibitors may be added to decrease corrosion in metal parts within the well or at the surface. The corrosion inhibitors may include blends of imidazolines, or amine- and phosphorus-based corrosion inhibitors.

In some examples, partially hydrolyzed polyacrylamide (PHPA) and polyanionic cellulose (PAC) polymers may be included in the foam. These compounds may coat reactive soils such as swelling clay. Further, the long polymer chains increase foam stability and stiffness, which may increase the carrying capacity.

The constituents of a typical foam may include the base fluid, such as water, oil, and the like, comprising about 5 volume percent (vol. %) to about 40 vol. % of the total foam, or higher. The gases that may be used in the foam include nitrogen, carbon dioxide, and the like. The gas may comprise between about 60 vol. % and about 90 vol. % of the foam. The surfactant may comprise between about 0 vol. % and about 2 vol. % of the foam. The corrosion inhibitor may comprise between about 0 vol. % and about 1 vol. % of the foam. Other materials may be added at lower concentrations, such as the shale inhibitor, and polymeric materials used to stiffen the foam, among others. A stabilizer such as cyanuric acid may be added at a concentration of between about 30 ppm and 50 ppm.

The pH of the base fluid may be between about 6 and about 8, with an alkalinity of between about 0 ppm (parts per million) and about 60 ppm. The total hardness of the base fluid may be between about 100 ppm and 1000 ppm. The starting temperature of the base fluid may depend upon the ambient temperature of the surroundings, but may generally be about 77° F. Lower or higher temperatures may lead to decreased stability of the foam.

The foam may be pumped into a coil tubing 110 on a reel 111. The foam travels through the coil tubing 110 into the well 112, passing through a vertical well section 114, a horizontal well section 116, and exiting the coil tubing 110 through a bit or nozzle 118, or similar device. Here the foam 102 is expected to entrain sand 120 stirred up by the bit or nozzle 118 as the coil tubing 110 penetrates into the sand bed 122 as the coil tubing is fed into the well. The foam 102 and the entrained sand 120, or proppant, travel back up the annulus 124 to exit at the surface 104 against atmospheric pressure or pressure provided by a choke 126. The foam 102 carrying the entrained sand 120 may break, resulting in the release of the entrained sand 120 and base liquid 108, which may flow into a catch basin or tank as the gas 106 is released. In some examples, other devices may be used to implement the well cleanout, such as drill strings.

The model makes the assumption that the vertical well section 114 is at 90° to the direction of gravity, or the surface 104, in this example, and that the horizontal well section 116 is parallel to the direction of gravity, or the surface 104 in this example. For convenience in explaining the model in subsequent figures, the path of the foam 102 is indicated by the numbers 1 to 6 shown in circles in FIG. 1. Oblique angles may be used by the inclusion of an angular term in the equations, such as the hydraulics calculations.

Figure 2:
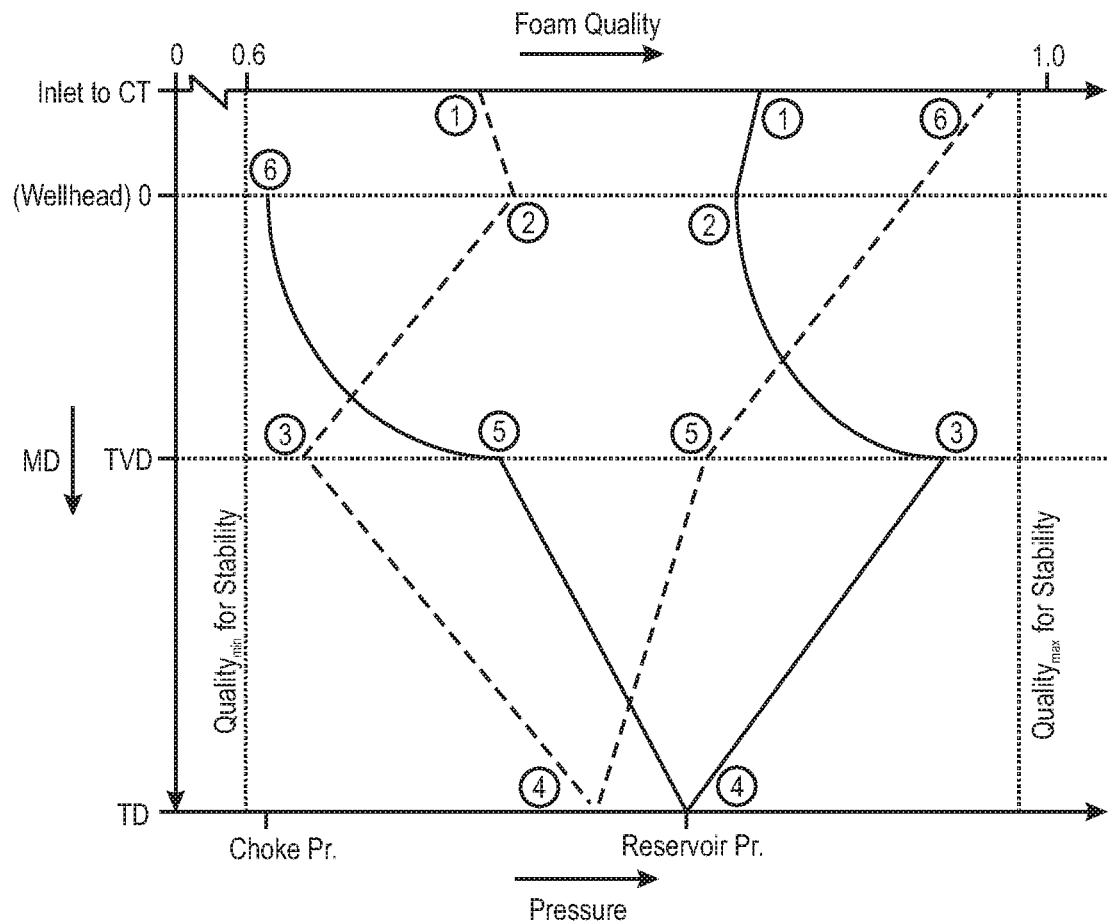
FIG. 2 is a plot of an example of the hydraulics of the foam as it flows through the coil tubing and the annulus during the well cleanout procedure.

FIG. 2 is a plot of an example of the hydraulics of the foam 102 as it flows through the coil tubing 110 and the annulus 124 during the well cleanout procedure. The pressure is indicated by a solid line and the foam quality may be indicated by a dashed line. It can be noted that the dashed lines for the foam quality are merely used as illustrations. The actual form of the equation between the points may be more complex than the straight dashed lines. The quality of the foam is described by equation 1, and symbolically in equation 2.

$$\text{Quality} = \frac{\text{Gas Volume}}{\text{Gas Volume} + \text{Liquid Volume}} \qquad \text{Eqn. 1}$$

Referring also to FIG. 1, as the foam 102 exits the pump 109 (at 1), the pressure is high and the quality low, due to compression. As the foam 102 flows through the coil tubing 110 on the reel 111 the pressure drops, allowing the foam 102 to expand and the quality to increase as it enters the well 112 (at 2).

As the foam 102 flows in the coil tubing 110 down the vertical well section 114 of the coil tubing 110 its pressure increases non-linearly (from 2 to 3) due to hydrostatic pressure. The non-linearity of the hydrostatic pressure change is due to the increase in the density of the foam 102 from compression of the gas phase. This results in the quality of the foam 102 decreasing to a minimum value (at 3) and the pressure increasing to its highest value at (at 3), as the foam 102 reaches its total vertical depth (TVD). Although the quality may increase due to frictional pressure drop and geothermal heating, these effects are generally negligible compared to the effect of the hydrostatic pressure. However, they may become comparable depending on the length of the vertical column of foam and the frictional pressure drop of the foam (based on flow rate and annulus flow area).

The foam 102 enters the horizontal well section 116 of the coil tubing (at 3), where its pressure decreases and quality increases as it travels to bottom hole (from 3 to 4). The target is to maintain the bottom hole pressure (BHP) as close as possible to the reservoir pressure to prevent either the influx of fluid from the reservoir or the loss of foam to the reservoir.

As the foam 102 exits the bit or nozzle 118 (at 4), the foam 102 picks up, or entrains, sand 120 and flows through the horizontal well section of the annulus 124 (from 4 to 5), where the pressure continues to drop, and quality continues to rise. The foam 102 with the entrained sand 120 flows up the vertical well section of the annulus 124 (from 5 to 6), where the pressure drops due to friction and a decrease in hydrostatic pressure. Thus, the foam 102 has the highest quality and lowest pressure as it exits the annulus 124 (at 6).

Figure 3:
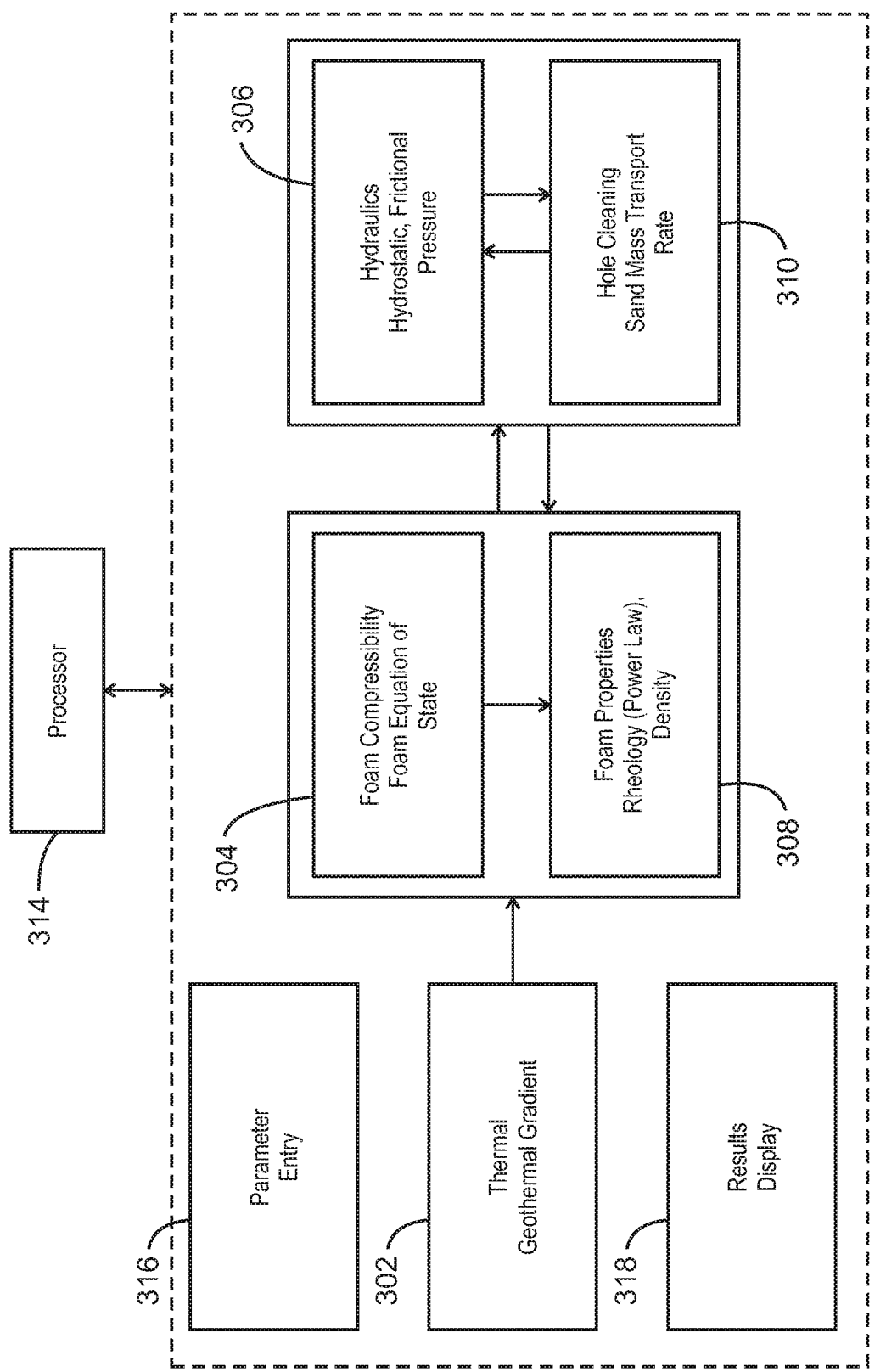
FIG. 3 is a block diagram of an example of a foam calculator or model that may be used to predict if well cleanout may be performed by foam.

FIG. 3 is a block diagram of an example of a foam calculator 300 or model that may be used to predict if well cleanout may be performed by foam. The foam calculator 300 may include several calculators or modules that are implemented by processors using code accessed from a storage system, as described further with respect to FIG. 10.

A number of assumptions are made to simplify the calculations for the foam calculator 300. The foam calculator 300 is a bulk scale foam model which assumes that the bubble size in the foam is substantially less than the pipe diameter. For example, the average diameter of the bubbles may be about 0.5 mm to about 2 mm. By comparison, the coil tubing may be about 24 mm to about 60 mm, or larger, in diameter. Further, the wellbore may be about 125 mm to about 250 mm, or larger, in diameter.

The foam hydraulics may be modeled in the coil tubing and in the annulus, between the coil tubing and the cases, in deviated wells containing a sand (or proppant) bed. A one-dimensional, steady state model may be used to model the foam flow in the coil tubing and the annulus. The foam calculator 300 models sand pickup and its effect on foam hydraulics.

The foam calculator 300 models the complex foam rheology as a non-Newtonian (or power Law) fluid. Thus, the foam may be assumed to be thixotropic. The model includes the effect of geothermal gradient and the compressibility of the foam on the hydrostatic and hydraulic properties of the foam.

In addition to the mathematical assumptions, physical assumptions are also made in the model. For example, the well path may be simplified into a vertical well section and a horizontal well section, as described with respect to FIG. 1. In this example, the casing and coil tubing size may be assumed to be uniform throughout the well. However, in some examples, the size of the tubing may vary. The coil tubing may be assumed to be fully concentric, or centered, in the vertical well section and fully eccentric, or laying along the bottom, in the horizontal well section. The sand bed height ahead of the bit may be uniform and, in some examples, comprised of uniformly sized particles.

Although there may be some effects on the foam from the entrained sand, or proppant, the model may ignore the effect of sand on foam viscosity. This assumption may be valid at low sand concentrations, such as less than about 5%, less than about 10%, less than about 15%, or higher depending on the particle size. In some example, particle size and shape may be incorporated in the equations.

The foam calculator 300 may assume that there are no losses of foam to the formation. Further, the assumption may be made that there is no influx of formation fluids into the foam. This is described with respect to FIG. 2, wherein the bottom hole pressure of the foam is targeted to match the reservoir pressure.

A number of assumptions may be made about the properties of the foam as well. The foam may be assumed to be stable, and with properties that vary linearly in the well, or in a discrete section of the well. The rheological calculations for the foam in the foam calculator 300 may depend only on pressure, temperature, and foam quality. Accordingly, the bubble size and arrangement may be ignored in examples described herein, although some examples may account for bubble size. The foam may be assumed to have a highly compressible gas phase and incompressible liquid phase.

The foam calculator 300 may assume that the sand mass rate is constant along the wellbore. Further, the assumption may be made that the sand bed height is uniform along the entire horizontal section ahead of the bit and behind the bit and the two bed heights may be different.

Although these assumptions may be made in the foam calculator 300, in some examples, different assumptions may be made. For example, more complex models may account for differently sized particles along the sand bed.

The foam calculator 300 includes a geothermal gradient module 302 to determine the geothermal gradient in the well. In many examples, the temperature increases with depth, and may reach a maximum in the horizontal section at the TVD. The geothermal gradient may be determined from simulations or modeling based on well logs, and other data collected from the well. While the temperature at the depth of the calculation may be determined, the temperature effects may be lower than pressure affects in the vertical well section.

The determination of the geothermal gradient in the well may be based on a number of formulae. For example, the bottom hole temperature may be calculated using the formula of equation 2.

$$T_{TVD} = T_{bh} = T_s + \text{geothermal gradient} * TVD \qquad \text{Eqn. 2}$$

In equation 2, $T_{TVD}$ is the temperature at true vertical depth (TVD), $T_{bh}$ is the temperature at bottom home, and $T_S$ is the temperature at the surface. The average temperature in the vertical well section may be determined using the formula of equation 3.

$$T_{avg,vertical} = \frac{T_{bh} + T_S}{2} \qquad \text{Eqn. 3}$$

The average borehole temperature may be determined using the formula of equation 4.

$$T_{avg} = T_{bh} - \frac{TVD}{2TD}(T_{bh} - T_S) \qquad \text{Eqn. 4}$$

The foam calculator 300 may include a foam compressibility module 304 that uses a foam equation of state to solve for changes in foam quality, for example, based on temperature and pressure changes. The foam equation of state may be derived as described below. Foam quality is defined symbolically as shown in equation 5.

$$\Gamma = \frac{V_g}{V_g + V_l} \qquad \text{Eqn. 5}$$

In equation 2, $\Gamma$ represents the quality of the foam, while $V_g$ and $V_l$ represent the gas volume and the liquid volume, respectively. The ideal gas law is shown in equation 6.

$$PV_g = Zn\overline{R}T \qquad \text{Eqn. 6}$$

In equation 6, P represents the pressure, Z represents a compressibility factor, T represents the temperature, n is the number of moles of gas, and $\overline{R}$ is the universal gas constant. Solving for $V_g$ and substituting into equation 5 gives the relationship shown in equation 7.

$$\frac{ZT}{P}\left(\frac{1}{\Gamma} - 1\right) = \frac{V_l}{n\overline{R}} \qquad \text{Eqn. 7}$$

In equation 7, the right-hand side is a constant. Using the relationship of equation 7, the equation of state may be written as shown in equation 8.

$$\frac{Z_1 T_1}{P_1}\left(\frac{1}{\Gamma_1} - 1\right) = \frac{Z_2 T_2}{P_2}\left(\frac{1}{\Gamma_2} - 1\right) \qquad \text{Eqn. 8}$$

The equation of state, as shown in equation 8, may be used to solve for the change in foam quality as the pressure is changed from a first value to a second value, where the temperature is changed from first value to a second value.

The compressibility factor may be calculated using the formula shown in equation 9.

$$Z = 1 + \left(A_1 + \frac{A_2}{T_r} + \frac{A_3}{T_r^3} + \frac{A_4}{T_r^4} + \frac{A_5}{T_r^5}\right)\rho_r + \left(A_6 + \frac{A_7}{T_r} + \frac{A_8}{T_r^2}\right)\rho_r^2 - \\ A_9\left(\frac{A_7}{T_r} + \frac{A_8}{T_r^2}\right)\rho_r^5 + A_{10}(1 + A_{11}\rho_r^2)\frac{\rho_r^2}{T_r^3}e^{-A_{11}\rho_r^2} \qquad \text{Eqn. 9}$$

The term $\rho_r$, used in equation 9, may be calculated using the formula shown in equation 10.

$$\rho_r = \frac{Z_c p_r}{ZT_r} \qquad \text{Eqn. 10}$$

The reduced pressure, $p_r$, may be calculated using the formula shown in equation 11.

$$p_r = \frac{P}{P_c} \qquad \text{Eqn. 11}$$

The reduced temperature, $p_r$, may be calculated using the formula shown in equation 12.

$$T_r = \frac{T}{T_c} \qquad \text{Eqn. 12}$$

For nitrogen, the critical pressure, $P_c$, is about 33.5 atmospheres (atm), and the critical temperature, $T_c$, is about 126.2 Kelvin (K). Furthermore, in the operating range of pressure and temperature described herein, nitrogen remains in the gaseous state. The model coefficients that may be used for Nitrogen are: $A_1$=0.4145; $A_2$=−0.8856; $A_3$=−1.373; $A_4$=−1.307; $A_5$=2.944; $A_6$=0.2447; $A_7$=−0.2534; $A_8$=0.2812;

$A_9$=0.3137; $A_{10}$=0.3073; $A_{11}$=0.1352; and $Z_c$=0.2916. The same compressibility model may be used for air and carbon dioxide foams. In these examples, the coefficients, critical pressure, and critical temperature may be adjusted to match the gas used.

The foam calculator 300 may include a hydraulics module 306. This may be derived from the differential equation for hydrostatic pressure change shown in equation 13.

$$dP = \rho_{fs} g \, dx \qquad \text{Eqn. 13}$$

where g represents the acceleration due to gravity. In equation 13, $\rho_{fs}$ represents the foam density with solids. The foam density with solids, and the foam density with no solids, $\rho_f$, can be represented as shown in equation 14 and 15, respectively $$\rho_{fs} = (1-\alpha_s)\rho_f + \alpha_s \rho_s \qquad \text{Eqn. 14}$$

$$\rho_f = (1-\Gamma)\rho_l + \Gamma \rho_g \qquad \text{Eqn. 15}$$

where $\alpha_s$ represents the volume concentration of solids in the foam, $\rho_l$ is the liquid density, and $\rho_g$ is the gas density. These values can be substituted into the equation of state, shown in equation 8, to give equation 16.

$$\Gamma = \frac{1}{1 + \frac{Z_s T_s P}{ZTP_s}\left(\frac{1}{\Gamma_s} - 1\right)} \qquad \text{Eqn. 16}$$

where the surface location is chosen to be one of the points in equation 13 while the other point is the location of interest where the hydrostatic pressure is to be determined. Solving the ideal gas equation for the gas density gives equation 17.

$$\rho_g = \frac{P}{ZRT} \qquad \text{Eqn. 17}$$

In equation 17, $$R = 296.8 \frac{J}{kg - K},$$

which is the specific gas constant for nitrogen.

If the temperature (T) is assumed to be set at $T_{avg,vertical}$ (equation 3) in equations 16 and 17, and the compressibility (Z) is assumed to be $Z_{avg,vertical}$ in equations 16 and 17, then substituting equation 17 into equation 16, followed by substituting equation 16 into equation 15, equation 15 into equation 14, then equation 14 into equation 13, and integrating the resulting equation, gives equation 18.

$$\left(\frac{ac-eb}{a^2}\right)\ln\left[\frac{aP+b}{aP_s+b}\right] + \frac{e}{a}(P-P_s) = TVD \qquad \text{Eqn. 18}$$

In equation 18, the terms a, b, c, and e may be calculated using the formulas shown in equations 19 through 23.

$$a = \left[(1-\alpha_s)(1-\Gamma_s)\rho_l Z_s T_s + \alpha_s \rho_s Z_s T_s (1-\Gamma_s) + \frac{P_s \Gamma_s (1-\alpha_s)}{R}\right]\frac{1}{g} \qquad \text{Eqn. 19}$$

-continued $$b = \alpha_s \rho_s Z_{avg,vertical} P_s T_{avg,vertical} \Gamma_s g, \qquad \text{Eqn. 20}$$

$$\text{in which } Z_{avg,vertical} = (Z_s + Z_{bh})/2 \qquad \text{Eqn. 21}$$

$$c = Z_{avg,vertical} P_s T_{avg,vertical} \Gamma_s \qquad \text{Eqn. 22}$$

$$e = Z_s T_s (1 - \Gamma_s) \qquad \text{Eqn. 23}$$

Equation 18 may be iteratively solved by specifying an initial guess $P_{initial}=1$ for the hydrostatic pressure, P. A root finding method such as the Newton-Raphson, Bisection method, or similar or a combination of these methods may then be used to find the solution to equation 18. As used herein, the solution may be the minimum, or zero point, and which the left and right sides of equation 18 are equal. In some examples, a solution may be considered to be reached when the two sides of equation 18 are within a range of values of each other, such as within about 1%, within about 2%, within about 5%, or higher.

The foam calculator 300 may include a foam properties module 308 that calculates the properties of the foam based in part on the rheology and density of the foam. Research has shown that foam rheology may be captured by a power law model, as discussed in Duan, Mingqin, et al. "Experimental study and modeling of cuttings transport using foam with drillpipe rotation." *SPE Drilling & Completion*, Vol. 25, Issue 3 (2010): pp. 352-362. In an example, the power law model may be as shown by the formula of equation 24.

$$\tau = k\dot{\gamma}^n \qquad \text{Eqn. 24}$$

For equation 24, k may be calculated as shown in the formula of equation 25, and n may be calculated by the formula shown in equation 26.

$$k = \frac{0.2022\exp(-36.86\Gamma^2 + 68.04\Gamma - 27.68)}{1 + \exp\left[-1.045\left(\frac{P/6895 + 205}{1.8T - 375}\right) + 1.81\right]} \qquad \text{Eqn. 25}$$

$$n = 1 - 0.613\Gamma^{0.567} \qquad \text{Eqn. 26}$$

Further, $\tau$ is the shear stress k is the consistency index, $\dot{\gamma}$ is the strain rate, and n is the power law index in the power law model. The formulas of equations 25 and 26 may be obtained from experimental data. Different foams can lead to modifications of equations 25 and 26.

The effective viscosity may be calculated by the formula of equation 27.

$$\mu_{eff} = \frac{k}{8}\left(\frac{v_f}{D_{eff}}\right)^{n-1}\left(\frac{2}{n}(3n+1)\right)^n \qquad \text{Eqn. 27}$$

Where the effective hydraulic diameter, $D_{eff}$, is the hydraulic diameter of the coil tubing or annulus section. In the example of a sand bed located behind the bit, or cleanout tool, the hydraulic diameter in the annulus may be derived using geometric relations. The apparent viscosity of the foam increases with quality and the density decreases with quality. Using equation 27 in the Reynolds number, a modified Reynolds number may be calculated by the formula of equation 28.

$$Re_{eff} = \frac{\rho_f v_f^{2-n} D_{eff}^n}{8^{n-1}\left(\frac{3n+1}{4n}\right)^n k} \qquad \text{Eqn. 28}$$

The rheology and modified Reynolds number may be used to calculate the pressure drop as described below.

The hydraulics module 306 may also include the calculation of frictional pressure for foam flows. The calculation of the pressure loss due to friction of the foam with the pipe may be performed by the formula of equation 29.

$$\Delta P_{fric,foam} = C\frac{2ff\rho_{f,avg}(v_{f,avg} - v_{slip,avg})^2 L}{D_{eff}} \qquad \text{Eqn. 29}$$

Where L is the length of the coil tubing or annulus section of interest. This could be the length of the discrete element. The average foam velocity may be determined using the formula shown in equation 30.

$$v_{f,avg} = \frac{m_f}{\rho_{f,avg}} \qquad \text{Eqn. 30}$$

In equation 30, $m_f$ is the mass flow rate of foam, which may be constant at steady state. This may be determined at any of the locations. The average density of foam in the section of length L may be calculated by the formula of equation 31.

$$\rho_{f,avg} = \frac{\rho_{f,in} + \rho_{f,out}}{2} \qquad \text{Eqn. 31}$$

A fanning friction factor, ff, for laminar flow may be calculation using the formula of equation 32.

$$ff = \frac{16}{Re_{eff}} \qquad \text{Eqn. 32}$$

For turbulent flow the friction factor is calculated using the Colebrook-White equation, shown as equation 33.

$$\frac{1}{2\sqrt{ff}} = 2.0\log\left[\frac{2.51}{2Re_{eff}\sqrt{ff}} + \frac{\varepsilon/D_{eff}}{3.7}\right] \qquad \text{Eqn. 33}$$

In equation 33, $\varepsilon$ is the roughness of the pipe, which may be approximated as the size of the sand in the case of flow over a sand bed. Equation 33 may be iteratively solved, similarly to the method used for the hydrostatic pressure of equation 18.

The calibration parameter C of equation 29 may be determined from experimental comparisons for frictional pressure drop, for example, using the formulas shown in equations 34 through 37 for various ranges of $\Gamma$.

$$C=2; \ \Gamma \leq 0.7 \qquad \text{Eqn. 34}$$

$$C=2-15(\Gamma-0.7); \ 0.7<\Gamma \leq 0.8 \qquad \text{Eqn. 35}$$

$$C=0.5; \ 0.8<\Gamma \leq 0.92 \qquad \text{Eqn. 36}$$

$$C=0.5+6.25(\Gamma-0.92); \ 0.92<\Gamma \qquad \text{Eqn. 37}$$

The calibration parameter may be updated as necessary to improve the accuracy of the tool based on field data.

Foam may slip in contact with a wall, lowering the friction. This may be caused by a thin liquid film forming between the foam and the wall due to liquid drainage from the foam. The slip velocity of the foam, $v_{slip,avg}$, can reduce the frictional pressure drop, and may be calculated using the formula in equation 38.

$$v_{slip,avg} = 80 \times 10^{-6}\left(\frac{1-\Gamma_{avg}}{\Gamma_{avg}}\right)\frac{\tau_w}{\mu_l} \qquad \text{Eqn. 38}$$

In equation 38, the constant, shown as $80 \times 10^{-6}$ here, depends on bubble size, $\mu_l$ is the liquid viscosity, and the wall shear stress $\tau_w$ may be determined by the formula in equation 39.

$$\tau_w = \frac{2\mu_{eff,avg}v_{f,avg}}{D_{eff}} \qquad \text{Eqn. 39}$$

In equation 39, the average properties of the foam are based on the discrete segment, or section, of tubular of length L. The slip velocity may be incorporated into the calibration parameter in some examples.

Pressure drop may also have a component caused by inertial or acceleration effects. This component may be determined by the formula in Eqn. 40.

$$\Delta P_{fric,foam} = \tfrac{1}{2}(\rho_{f,out}v_{f,out}^2 - \rho_{f,in}v_{f,in}^2) \qquad \text{Eqn. 40}$$

In equation 40, "in" and "out" refer to the inlet and outlet of each discrete segment of tubular. The foam pressure at the outlet of each discrete segment depends on the hydrostatic pressure change, frictional pressure drop, and the inertial pressure drop.

The final calculation in the foam calculator 300 is a hole cleaning module 310. The hole cleaning module 310 may calculate a sand volume rate, $Q_s$, at the bit or cleaning tool, using the formula shown in equation 41.

$$Q_s = A_{bed}v_{CT}(1-\varnothing_{bed}) \qquad \text{Eqn. 41}$$

In equation 41, $A_{bed}$ is the cross-sectional area of the bed calculated using geometric relations from the bed height, $v_{CT}$ is the coil tubing running speed, and $\varnothing_{bed}=0.37$ is the porosity of the sand bed. The calculator may assume that all or part of the sand picked up is transported out of the hole by the foam.

The modules 302 to 310 of the foam calculator 300 may be code blocks, for example, stored in a non-transitory, machine readable medium 312. The code blocks may be executed by a processor 314, as described in further detail with respect to FIG. 9. Other modules may be provided to support the foam calculator 302, including a parameter entry module 316, which may use a human-machine interface, such as displayed in the screenshot of FIG. 6, to obtain parameters for the foam calculator 300 from a user. A results display module 318 may display tables and graphs with results that indicate if the foam cleanout is feasible, as described with respect to the screenshots of FIGS. 7 and 8. The tables display may indicate a set of conditions that provides the highest sand cleanout rate for a foam cleanout.

Figure 4:
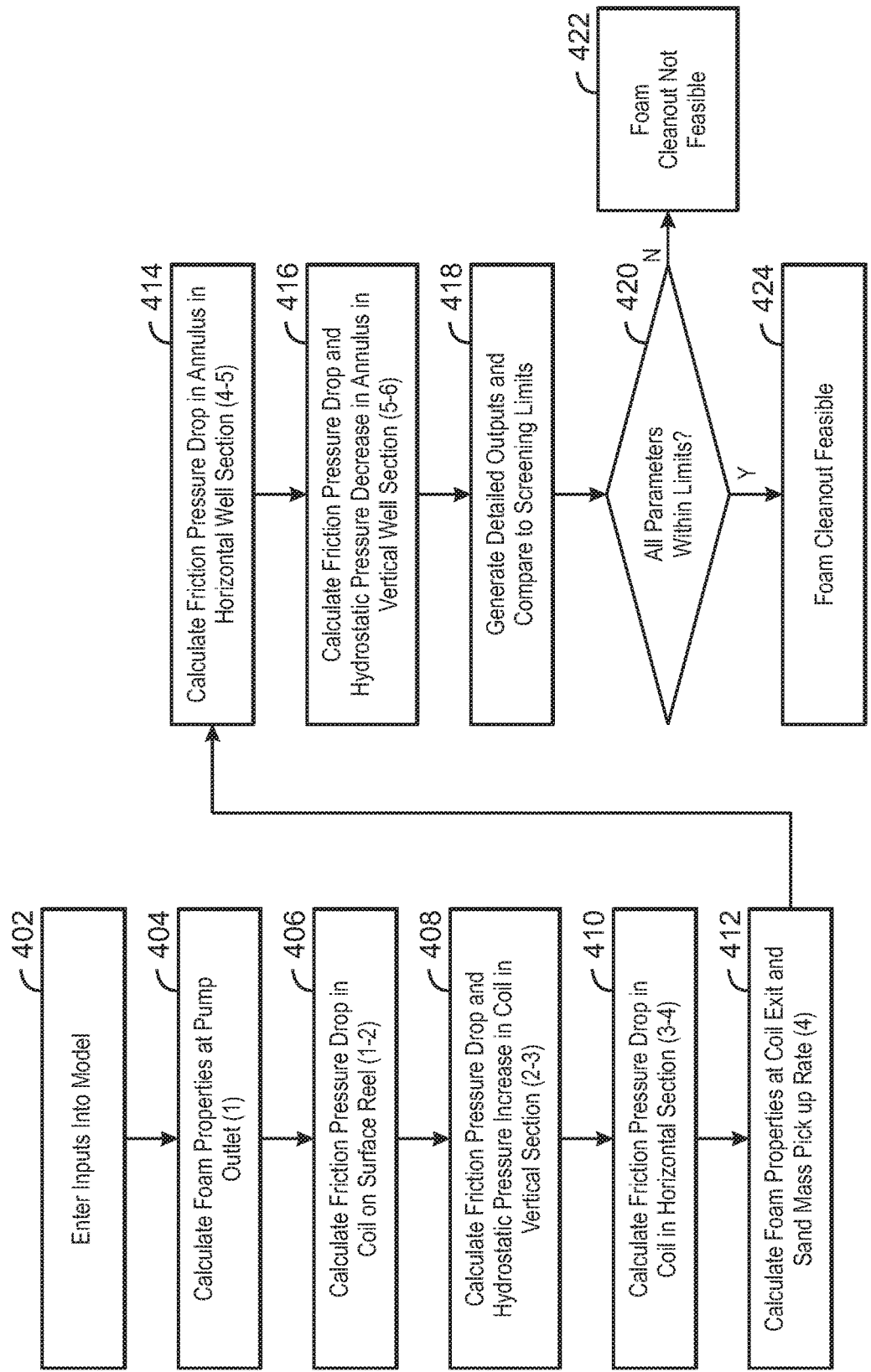
FIG. 4 is a process flow diagram of an example of a method for predicting whether foam cleanout may be used in a well.

FIG. 4 is a process flow diagram of an example of a method 400 for predicting whether foam cleanout may be used in a well. The method 400 may use the foam calculator 300 described with respect to FIG. 3. As described with respect to FIG. 1, the flow path may be discretized into five segments, 1-2, 2-3, 3-4, 4-5, and 5-6, between the numbered points, 1 to 6. The solution process may begin at 1, upstream of the inlet into the coil tubing to the annulus exit at 6.

At block 402, the inputs used by the model are entered. The inputs include characteristics about the well path and tubulars, such as TVD and MD, the inner diameter of the casing, the inner diameter of the coil tubing, the outer diameter of the coil tubing, and the coil length. Other inputs include characteristics of the materials and flow rates, such as sand mesh, sand density, sand bed height in the casing, liquid and gas injection rate to form the foam, pump pressure, coil tubing (CT) running speed, the stability range for the foam quality, the reservoir pressure, and the choke pressure limit, among others. As used herein, the running speed is the speed at which the CT is pushed into the well.

At block 404, the foam properties at the pump outlet (at 1) are calculated. The properties may include the quality of the foam, and the density of the foam, among others. These properties may be recalculated after each of the succeeding blocks, for example, to create the plot shown in FIG. 2.

At block 406, the frictional and inertial pressure drop in the coil tubing on the surface reel (from 1 to 2) is calculated. After block 406, the foam passes through the coil tubing and down into the wellbore.

At block 408, the frictional and inertial pressure drop and hydrostatic pressure increase in the coil in the vertical well section (from 2 to 3) is calculated. At block 410, the frictional and inertial pressure drop in the coil in the horizontal section (from 3 to 4) is calculated. At block 412, the foam properties at the exit of the coil tubing (4) and the sand mass pickup rate are calculated. After block 412, the foam flows through the wellbore, picking up sand.

At block 414, the frictional and inertial pressure drop in the annulus in the horizontal well section (from 4 to 5) is calculated. At block 416 the frictional and inertial pressure drop and hydrostatic pressure decrease in the annulus in the vertical well section (from 5 to 6) is calculated.

At block 418, outputs are generated and compared to screening limits. The primary outputs generated include bottom hole pressure, minimum quality, maximum quality, and the choke pressure at the annulus exit, among others. Detailed outputs may also be generated, including sand mass rate, hydrostatic pressure in coil tubing and annulus, friction pressure in coil tubing and annulus, bottoms up time, sand time to surface, bottom hole Reynolds number, and the sand concentration in the foam, among others. The outputs may be visualized by generating plots of quality versus MD, pressure versus MD, and Reynolds number versus MD, among others.

At block 420, a determination is made as to whether all parameters are within limits. For example, for a foam cleanout to be feasible, the bottom hole pressure may be within about 10%, about 5%, or about 2% of the reservoir pressure. The minimum quality may be greater than the lower limit for foam stability, and the maximum quality may be greater than the upper limit for foam stability. Further, the choke pressure may be less than the choke pressure limit. As described herein, the choke pressure can be provided by a choke, or may be atmospheric pressure. Further, the bottom up time for the foam may be compared with a sand settling time in the horizontal and vertical well sections to determine the feasibility of a foam cleanout.

The relationship between the calculated parameters with the limits for feasibility may be illustrated on an output screen by using a color code for blocks in a table. For example, blocks displaying parameters that are within limits may be highlighted in green, blocks displaying parameters that are partially within the parameter limits may be highlighted in amber, and blocks displaying parameters that are outside of limits may be highlighted in red.

If all the parameters are not within limits, then at block 422, a message may be provided that foam cleanout is not feasible. It may also provide guidance on input parameters to seek a feasible foam operation. If all of the parameters are within limits at block 420, then a message may be provided at block 424 reflecting that the foam cleanout is feasible and the parameter values or conditions providing the best cleanout rate may be highlighted. It may also provide guidance on input parameters to maximize cleanout rate.

Solving for the parameters in each of the blocks of the method 400 may include an iterative procedure. In an example, the flow in the coil tubing may be solved by iterating through blocks 406, 408, and 410 until the bottom hole pressure converges to within about 1%, within about 2%, within about 5%, or higher depending on desired accuracy. Further an under-relaxation factor of about 0.2 may be used to stabilize the numerical simulation. An under-relaxation factor may be employed in an iterative procedure to stabilize the calculation, for example, from undershoots and overshoots that may lead to oscillation in the results. The use of these factors may slow the iteration time by increasing the number of cycles used to reach convergence.

Similarly, the flow in the annulus may be solved by iterating through blocks 414, 416, and 418 until the choke pressure converges to within about 5%, within about 10%, or higher. Further an under-relaxation factor of about 0.2 may be used to stabilize the numerical simulation. The iterative scheme may be modified to converge each block individually before proceeding to the next block or may converge all blocks together. Further, the direction of the iterative procedure may be modified to improve the numerical simulation.

Figure 5:
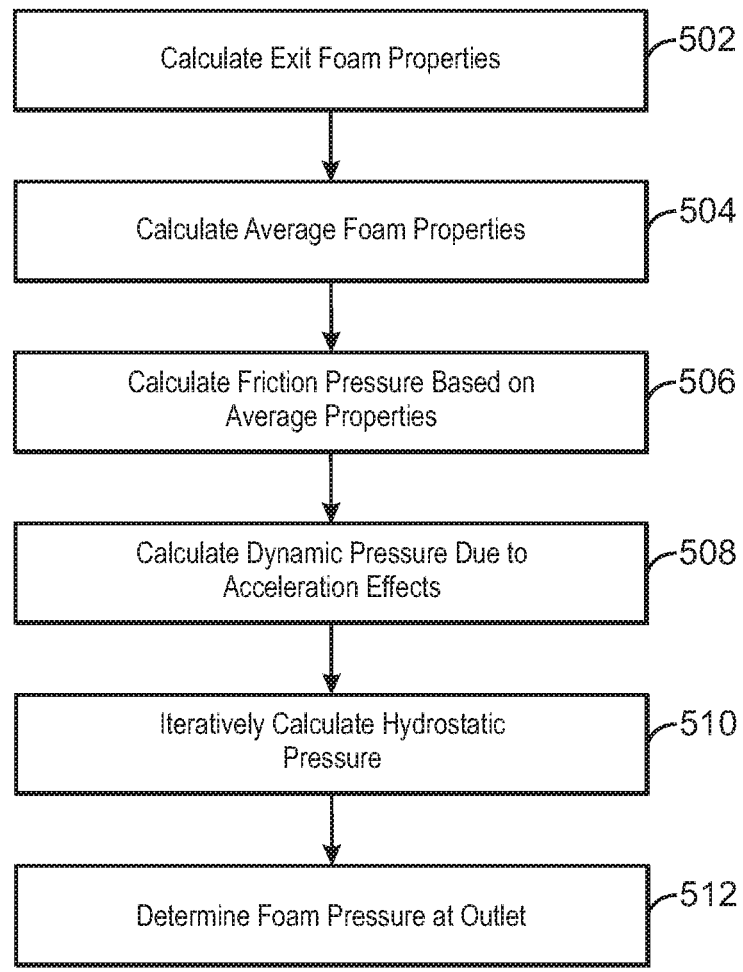
FIG. 5 is a process flow diagram of an example of the method that may be performed at each block in the method of FIG. 5.

FIG. 5 is a process flow diagram of an example of a method 500 that may be performed at each block in the method of FIG. 4. The method may start at block 502, when the exit foam properties, such as quality, reality, and density, for a segment are calculated. This may be performed by guessing the pressure at the exit. At block 504, the average foam properties through the segment are calculated. These may include pressure, temperature, density, volume flow rate, quality, and rheology, among others.

At block 506, the friction pressure, such as the Reynolds number giving the friction factor, and the slip velocity, may be determined based on the average properties. At block 508, the dynamic or inertial pressure due to acceleration effects may be calculated. At block 510, the hydrostatic pressure may be iteratively calculated. At block 512, the foam pressure at the outlet may be determined as a function of hydrostatic pressure, frictional pressure, and dynamic pressure, among others.

FIG. 6 is a screenshot of an example of a foam calculator 600 to a foam calculator that may use the methods of FIGS. 4 and 5 to predict whether a foam cleanout may be used in a well. The foam calculator 600 may for example use the system described with respect to FIG. 3. This system may be hosted on a distributed computing array as described with respect to FIG. 9.

The foam calculator 600 may include a number of tabs to access specific information about the modeling of the foam cleanout. An input tab 602 may access a screen 604 to allow user to enter the input parameters for the well and foam cleanout.

Some parameters are derived from other parameters. For example, the proppant mesh may provide an average proppant diameter, depending on proppant type. Other parameters include the operational parameters, such as the flow rate of the base liquid, the flow rate of the gas injection, the pump pressure, and the coil tubing running speed. These parameters may be used to provide a nominal value and percent deviation to perform a sensitivity study. The sensitivity study may help guide the specification of equipment, an initial parameters to be set on the foam cleanout. In this example, the sensitivity study may generate a total of 16 cases using different parameters.

In this example, once all the parameters have been entered, a user may click on a calculate button 606 to initiate the calculation. The calculate button 606 may indicate the status of the modeling with color changes, for example, turning a dark blue during the calculation period in a light blue once the calculation is ended.

Figure 7:
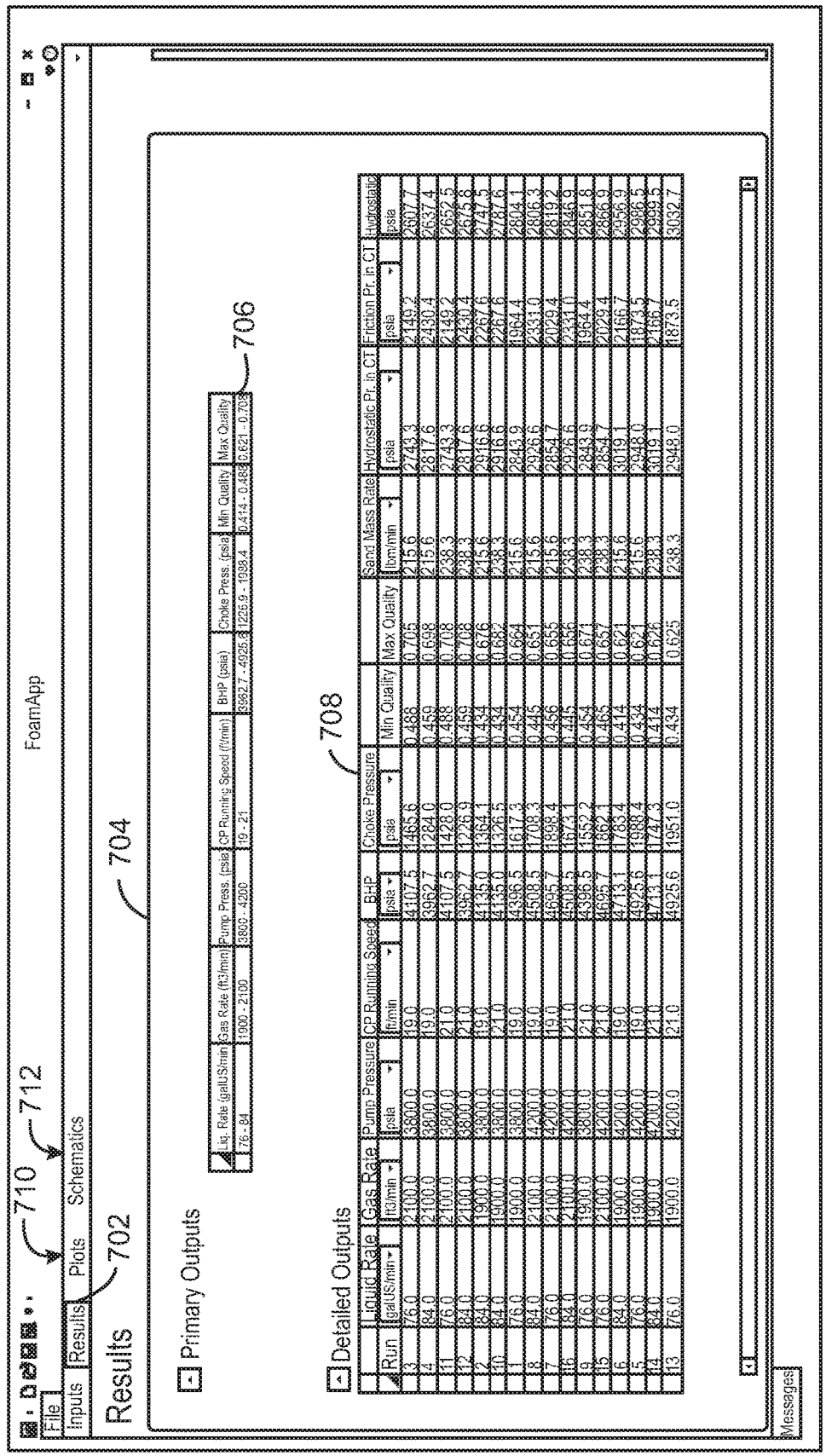
FIG. 7 is another screenshot of the foam calculator showing output parameters that may indicate whether a foam cleanout is feasible.

FIG. 7 is another screenshot of the foam calculator 600 showing output parameters that may indicate whether a foam cleanout is feasible. These results may be displayed by clicking on a results tab 702 in this example.

The results section 704 may include a primary outputs table 706 and a detailed outputs table 708. As described herein, the primary outputs may include bottom hole pressure (BHP), choke pressure, min quality for the foam, and max quality for the foam. The outputs may be provided as a range based on the range of the input operational parameters.

As described herein a color code may be used to indicate if the parameters of a particular cell in the tables 706 and 708 are within operational limits. For example, green may be used indicate if the range of an output value is within the range of the screening criteria for that particular output. Amber may be used to indicate that the range of an output value is partially within the range of the screening criteria for that particular output. The color red may be used indicate that the range of and output value is completely outside the range of the screening criteria for that particular output. For example, the reservoir pressure may be at about 4000 psi (pounds per square inch), and the screening range is set to 4000±10%, or about 3600 psi to about 4400 psi. If the bottom hole pressure (BHP) during the foam cleanout job is predicted to be in a range of about 3900 psi to about 4100 psi within a defined cell and such pressure range is within the acceptable criterion range, then the indicator color of the defined cell may be green.

The detailed outputs table 708 may include the results from all 16 cases using the different parameters. A color coding system, as described with respect to the primary outputs table 706, may be used indicate when a value within a cell is within a screening limit. For example, if the reservoir pressure is 4000 psi, and a screening range is ±10%, the screening range is between about 3600 psi to about 4400 psi. In this example, the BHP is about 3500 psi. Since it is outside the range the color of the cell may be red.

Other information may be provided by the foam calculator 600, for example, plots may be included to show the variation of pressure, quality, and Reynolds number along the well. The respective envelopes used in these plots may be based on the range of input operational parameters. The plots may be accessed by clicking on a plots tab 710. A schematics tab 712 may provide the well schematic and hydraulics pressure and quality profiles to a user.

Figure 8:
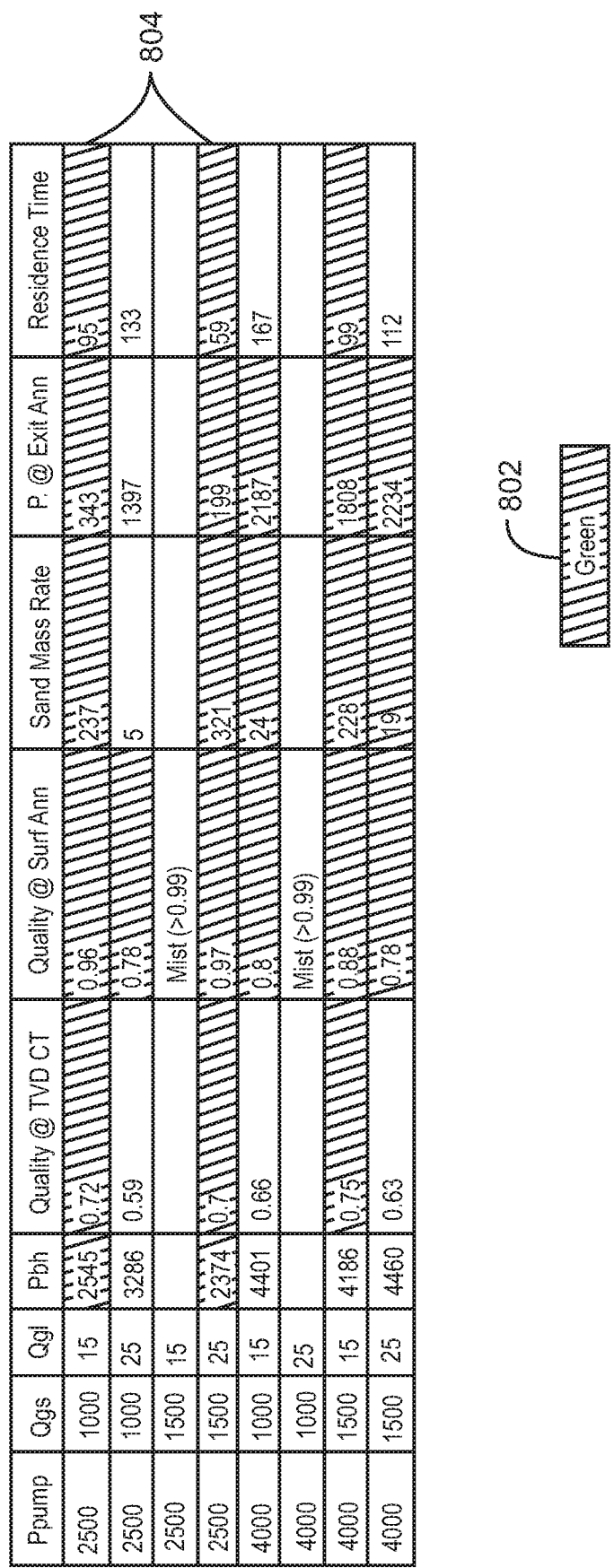
FIG. 8 is another example of an output table showing outputs from a foam calculator indicating that a foam cleanout is feasible for at least two sets of conditions.

FIG. 8 is another example of an output table 800 showing outputs from a foam calculator indicating that a foam cleanout is feasible for at least two sets of conditions. In the output table 800, green blocks 802 are used to indicate when parameters are within limits. In this example, two sets of parameters 804 have all values within the operational limits. Once sets of conditions are identified which have parameters with an operational limits, a user may select the set of parameters that provides the highest sand mass rate, or cleanout, for example, 321 in this example.

Figure 9:
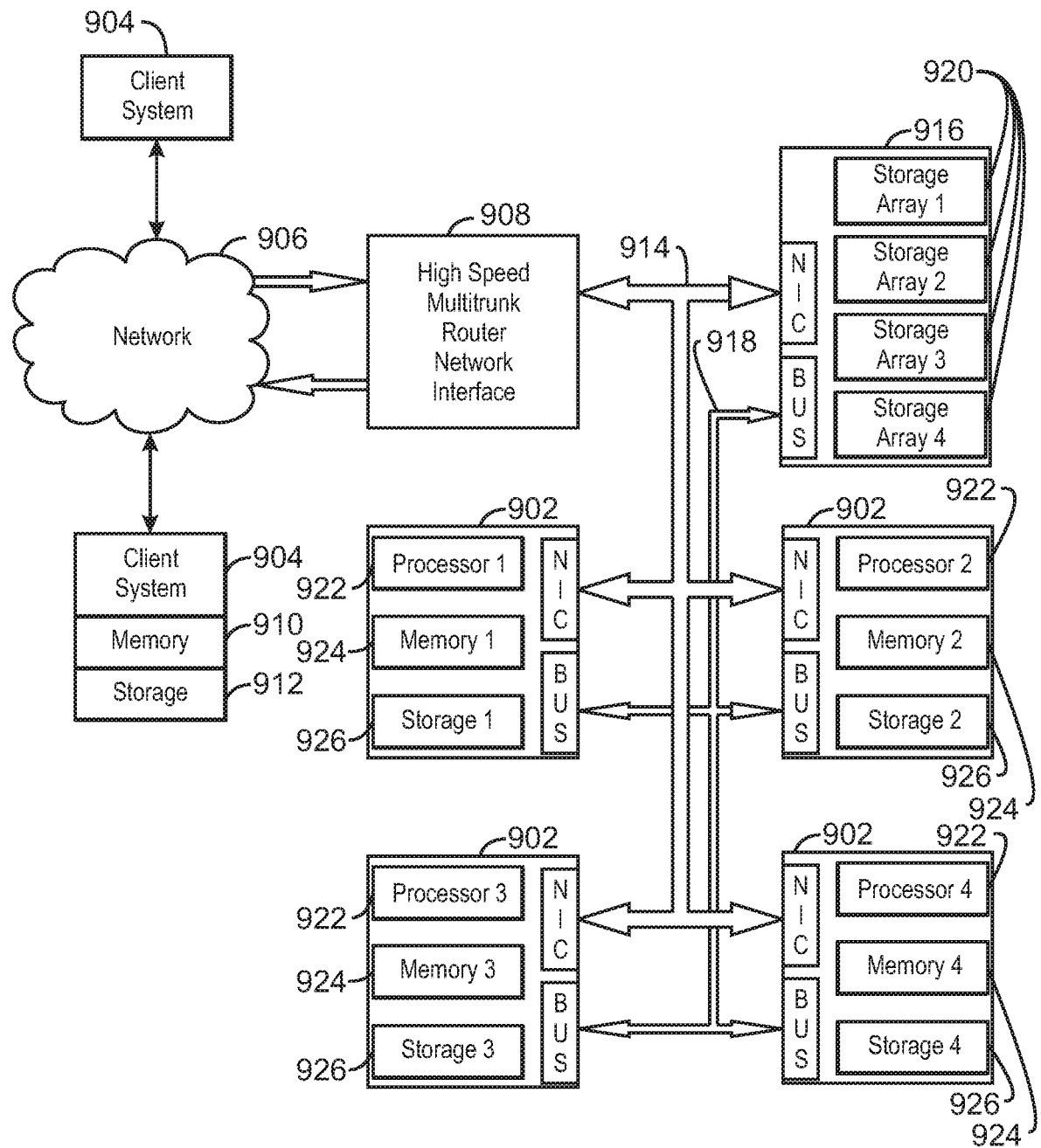
FIG. 9 is an example of a cluster computing system that may be used to host a foam calculator.

FIG. 9 is an example of a cluster computing system 900 that may be used to host a foam calculator. The cluster computing system 900 illustrated has four computing units 902, each of which may perform calculations for a part of the foam calculator. However, one of ordinary skill in the art will recognize that the present techniques are not limited to this configuration, as any number of computing configurations may be selected. For example, a smaller analysis may be run on a single computing unit 902, such as a workstation, while a large foam computation calculation may be run on a cluster computing system 900 having 10, 100, 1000, or even more computing units 902.

The cluster computing system 900 may be accessed from one or more client systems 904 over a network 906, for example, through a high speed network interface 908. The computing units 902 may also function as client systems, providing both local computing support, as well as access to the wider cluster computing system 900.

The network 906 may include a local area network (LAN), a wide area network (WAN), the Internet, or any combinations thereof. Each of the client systems 904 may have non-transitory, computer readable memory 910 for the storage of operating code and programs, including random access memory (RAM) and read only memory (ROM). The operating code and programs may include the code used to implement all or any portions of the methods discussed herein, for example, as discussed with respect to FIGS. 4 and 5. Further, the non-transitory computer readable media may hold well models, foam models, geothermal models, sand transport models, and the like, such as described with respect to FIG. 3. The client systems 904 can also have other non-transitory, computer readable media, such as storage systems 912. The storage systems 912 may include one or more hard drives, one or more optical drives, one or more flash drives, any combinations of these units, or any other suitable storage device. The storage systems 912 may be used for the storage of well models, foam models, geothermal models, sand transport models, code, data, and other information used for implementing the methods described herein.

The high speed network interface 908 may be coupled to one or more communications busses in the cluster computing system 900, such as a communications bus 914. The communication bus 914 may be used to communicate instructions and data from the high speed network interface 908 to a cluster storage system 916 and to each of the computing units 902 in the cluster computing system 900. The communications bus 914 may also be used for communications among computing units 902 and the cluster storage array 916. In addition to the communications bus 914 a high speed bus 918 can be present to increase the communications rate between the computing units 902 and/or the cluster storage system 916.

The cluster storage system 916 can have one or more non-transitory, computer readable media devices, such as storage arrays 920 for the storage of well models, foam models, geothermal models, sand transport models, and the like, for example, concerning the modeling of foam cleanout operations. The storage arrays 920 may include any combinations of hard drives, optical drives, flash drives, holographic storage arrays, or any other suitable devices.

Each of the computing units 902 can have a processor 922 and associated local tangible, computer readable media, such as memory 924 and storage 926. Each of the processors 922 may be a multiple core unit, such as a multiple core CPU or a GPU. The memory 924 may include ROM and/or RAM used to store code, for example, used to direct the processor 922 to implement the methods discussed with respect to FIGS. 4 and 5 using the models discussed with respect to FIG. 3. The storage 926 may include one or more hard drives, one or more optical drives, one or more flash drives, or any combinations thereof. The storage 926 may be used to provide storage for well models, foam models, geothermal models, sand transport models, and the like, including code used to implement the method of FIGS. 4 and 5.

The present techniques are not limited to the architecture or unit configuration illustrated in FIG. 9. For example, any suitable processor-based device may be utilized for implementing all or a portion of embodiments of the present techniques, including without limitation personal computers, networks personal computers, laptop computers, computer workstations, GPUs, mobile devices, and multi-processor servers or workstations with (or without) shared memory. Moreover, embodiments may be implemented on application specific integrated circuits (ASICs) or very large scale integrated (VLSI) circuits. In fact, persons of ordinary skill in the art may utilize any number of suitable structures capable of executing logical operations according to the embodiments.

While the present techniques may be susceptible to various modifications and alternative forms, the embodiments discussed above have been shown only by way of example. However, it should again be understood that the techniques is not intended to be limited to the particular embodiments disclosed herein. Indeed, the present techniques include all alternatives, modifications, and equivalents falling within the true spirit and scope of the appended claims.

What is claimed is:

1. A method for performing a foam cleanout of a well, comprising:
   calculating foam properties at each of a plurality of segments in the well during the foam cleanout, the calculating for a segment of the plurality of segments comprising:
   a) calculating foam properties at an exit from the segment;
   b) calculating average foam properties for the segment;
   c) calculating a frictional pressure drop based on the average foam properties in the segment;
   d) calculating dynamic pressure due to acceleration properties in the segment;
   e) iteratively calculating hydrostatic pressure in the segment; and
   f) determining pressure at the exit from the segment;
   determining a screening limit;
   comparing the foam properties to the determined screening limit;
   providing an output to indicate if a foam cleanout is feasible; and
   if feasible performing the foam cleanout, or if not feasible adjusting the foam properties until the output indicates that the foam cleanout is feasible and then performing the cleanout using the calculated foam properties for each of the plurality of segments.

2. The method of claim 1, comprising determining that the foam cleanout is feasible if a minimum quality calculated for a foam is greater than a lower limit for foam stability, a maximum quality calculated for the foam is less than an upper limit for foam stability, and a choke pressure is less than a choke pressure limit.

3. The method of claim 2, wherein the lower limit for foam stability is about 0.6, and the upper limit for foam stability is about 0.9.

4. The method of claim 2, wherein the choke pressure limit is at atmospheric pressure.

5. The method of claim 1, comprising determining that the foam cleanout is feasible if a foam pressure at bottom hole is within a selected error range of a reservoir pressure.

6. The method of claim 1, comprising:
   calculating properties for a foam at a pump outlet;
   calculating a frictional pressure drop in a coil tubing on a surface reel;
   calculating the frictional pressure drop and a hydrostatic pressure increase in the coil tubing in a vertical well section;
   calculating the frictional pressure drop in the coil tubing in a horizontal well section;
   calculating the properties of the foam and a sand transport rate at an exit of the coil tubing;
   calculating the frictional pressure drop in an annulus in the horizontal well section; and
   calculating the frictional pressure drop and a hydrostatic pressure decrease in the annulus in the vertical well section.

7. The method of claim 1, comprising determining a geothermal gradient in the well.

8. The method of claim 1, comprising calculating foam properties by using a foam equation of state to solve for changes in foam quality, based, at least in part, on a change in temperature, the change in pressure, or both.

9. The method of claim 1, comprising calculating a frictional pressure drop by:
   calculating an effective hydraulic diameter for a total length of the well, wherein the total length comprises vertical well sections and horizontal well sections; and
   calculating the frictional pressure drop due to friction of a foam with the well based, at least in part, on the effective hydraulic diameter.

10. The method of claim 1, comprising calculating a hydrostatic pressure change for a vertical column of foam from an equation of state for foam quality based, at least in part, on a foam density without entrained proppant.

11. The method of claim 1, comprising calculating a hydrostatic pressure change for a vertical column of foam from an equation of state for foam quality based, at least in part, on a foam density with entrained proppant.

12. The method of claim 1, comprising calculating foam properties based, at least in part, on a rheological property of a foam, a density of the foam, or both.

13. The method of claim 1, comprising using a power law model to determine a rheology of a foam.

14. The method of claim 1, comprising calculating an effective Reynolds number for a foam based, at least in part, on an effective hydraulic diameter.

15. The method of claim 1, comprising determining a sand transport rate for a foam.

16. The method of claim 1, comprising:
   modeling the foam cleanout at a plurality of conditions;
   performing a sensitivity study to determine a proppant cleanout rate for each of the plurality of conditions to determine which of the plurality of conditions provides a highest proppant cleanout rate; and performing the foam cleanout at the one of the plurality of conditions that provides the highest proppant cleanout rate.

17. The method of claim 16, comprising selecting equipment for the foam cleanout based, at least in part, on a result of the sensitivity study.

18. The method of claim 1, comprising:

injecting a gas into a mixer comprising water and surfactant to form a foam;

passing the foam through a coil tubing;

feeding the coil tubing through the well to reach a proppant bed in a horizontal well section;

carrying entrained proppant out of the well in the foam; and separating the entrained proppant from the foam at a surface.

* * * * *